United States Patent [19]

Romans

[11] 4,025,887
[45] May 24, 1977

[54] AC SOLENOID WITH SPLIT HOUSING

[75] Inventor: Julian R. Romans, Dearborn, Mich.

[73] Assignee: Sperry Rand Corporation, Troy, Mich.

[22] Filed: June 27, 1975

[21] Appl. No.: 591,186

[52] U.S. Cl. .............................. 335/278; 335/251
[51] Int. Cl.² .......................................... H01F 7/00
[58] Field of Search .......... 335/251, 255, 260, 278, 335/259

[56] References Cited

UNITED STATES PATENTS

| | | | |
|---|---|---|---|
| 1,222,900 | 4/1917 | Smith | 335/251 |
| 1,785,433 | 12/1930 | Body et al. | 335/255 |
| 1,987,555 | 1/1935 | Foster | 335/251 |
| 2,444,118 | 6/1948 | Snyder | 335/258 |
| 2,829,319 | 1/1958 | McCleskey | 335/258 |
| 2,890,308 | 6/1959 | Debrey | 335/255 X |
| 3,166,692 | 1/1965 | Forrester et al. | 335/251 |

*Primary Examiner*—Harold Broome
*Assistant Examiner*—Fred E. Bell
*Attorney, Agent, or Firm*—Theodore Van Meter

[57] ABSTRACT

A solenoid of the wet armature type for operating valves has the usual closed end tube within which a stationary pole piece and a slidable armature are mounted with a push pin extending through the pole piece. A bobbin-mounted energizing coil surrounds the tube. A generally barrel-shaped housing surrounds the coil and the tube. The housing has thick walls and is formed of magnetically permeable material to provide a low reluctance path extending substantially completely around the outside of the coil and along its two ends. The housing is formed in the plurality of sections spaced from one another along axial planes and clamped together against the tube by clamping members at either end. The housing is provided with conical clamping surfaces. The housing members are formed from sintered powdered magnetic iron.

7 Claims, 4 Drawing Figures

AC SOLENOID WITH SPLIT HOUSING

Electric solenoids of the wet armature type are widely used as valve operators and are favored because of their ability to operate a longitudinally moveable valve member without requiring any sliding seal between the member and the valve or solenoid body. This advantage is obtained, however, only at the cost of a lower efficiency resulting in high heat losses as well as poor mechanical protection for the coil, except by encapsulation. The latter expedient is undesirable since it interferes with heat rejection and also requires that the coil may not be replaced or interchanged with one of different electrical characteristics except by replacing or exchanging the entire encapsulated unit which includes the external magnetic structure. This requires manufacturers and distributors to carry a high inventory of expensive units in order to meet the trade requirements for the whole variety of coil specifications which the trade requires.

The present invention aims to provide a highly efficient wet armature solenoid in which the foregoing difficulties are eliminated or greatly reduced.

Another object of the invention is to provide such a solenoid in which the external magnetic structure serves as a coil-enclosing housing which contributes to the operating efficiency of the solenoid by minimizing eddy currents.

A further object is to provide such a solenoid in which the coil is fully protected from mechanical damage and from contamination by dirt, oil, etc., without encapsulation.

Another object is to provide such a solenoid which will meet the requirements of the U.S. Occupational Safety and Health Act regarding dispersal of gas resulting from burn-outs.

These objects are achieved by providing a solenoid construction comprising a tube with an open end and a closed end, a pole piece with a central passage, fixed in the open end, a push rod in the central passage, an armature slidable in the tube toward and away from the pole piece and push rod, an energizing coil surrounding the tube, and a magnetic permeable cover surrounding the coil and the tube, the cover comprising a plurality of sections spaced only slightly from each other circumferentially around the tube and coil and together having a total magnetic reluctance substantially the same as the reluctance of the pole piece, and means securing the cover sections in position around the tube and coil.

IN THE DRAWINGS

Figure 1:
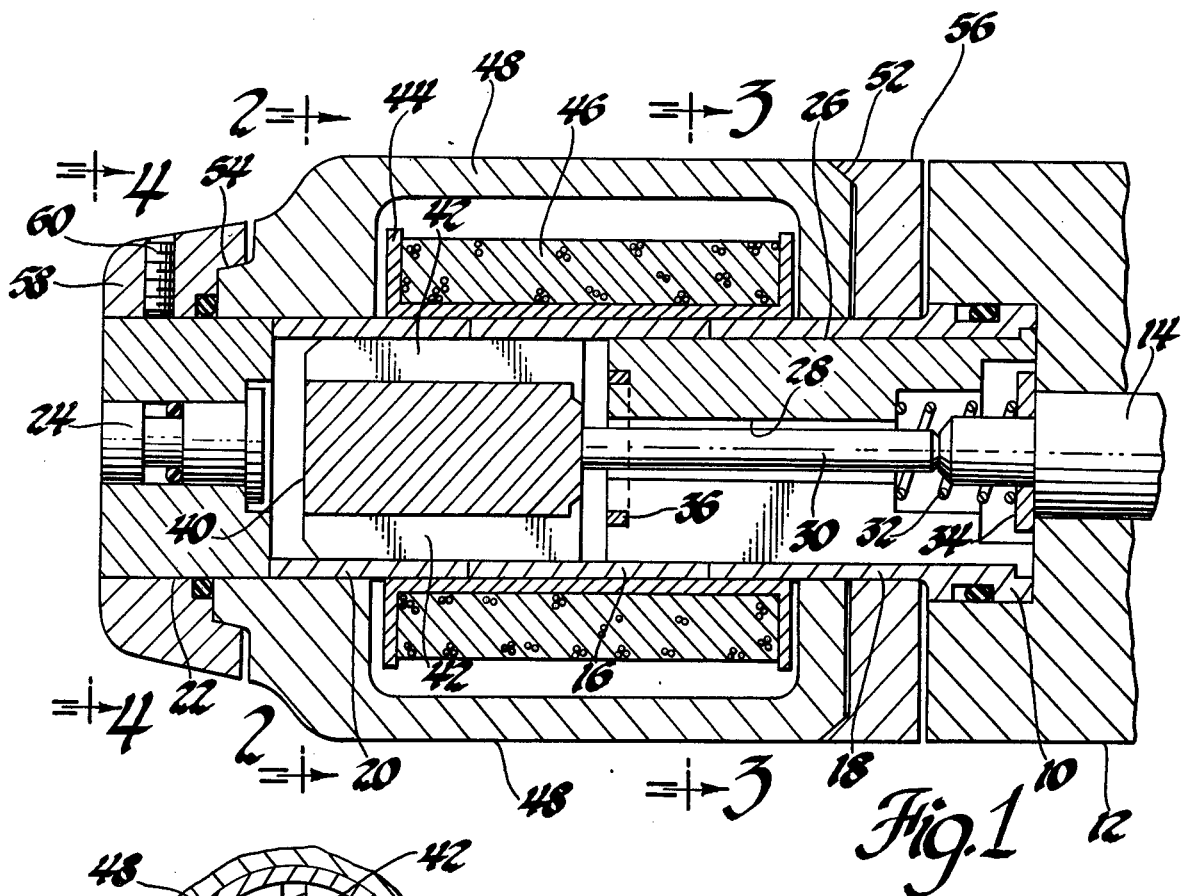
FIG. 1 is a longitudinal cross-sectional view of a solenoid embodying a preferred form of the present invention.
Figure 2:
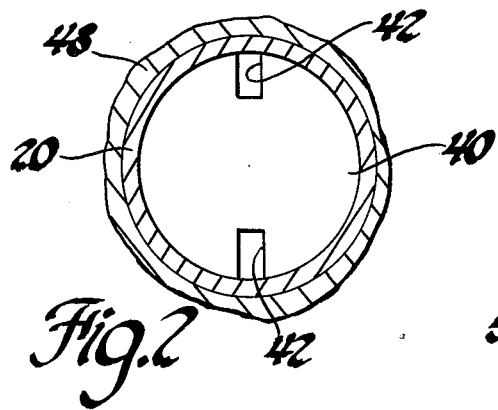
FIG. 2 is an end view of the solenoid armature.

The embodiment of the invention illustrated in the drawings includes a central core tube 10 which is rigidly secured and sealed to a valve body 12 having a shiftable spool 14 to be actuated by the solenoid. The core tube 10 is formed of three tubular sections welded together as by electron beam welding. Central section 16 is preferably of non-magnetic stainless steel and the end sections 18 and 20 are formed of magnetic stainless steel. An end plug 22 of non-magnetic stainless steel is welded to the left end of the core tube and carries a slidable plunger 24 for manually actuating the valve in case of power failure or malfunction. The core tube assembly including the end plug 22 and the plunger 24 may be considered as an extension of the valve body 12 in its function of enclosing within fluid-tight walls all of the internal fluid passages and thus eliminating the need for sliding seals between the active stationary and moving parts of the assembly in normal operation.

Figure 3:
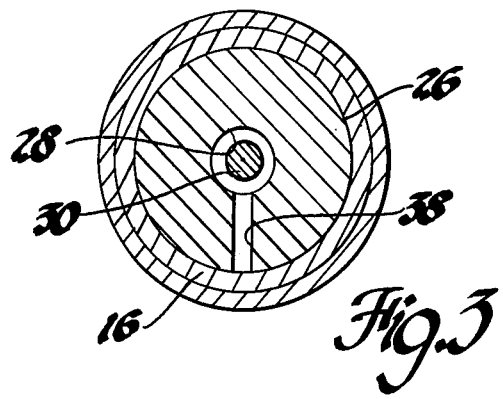
FIG. 3 is an end view of the solenoid pole piece.

Rigidly secured within the core tube 10 prior to its assembly to the valve body 12 is a pole piece 26 having a central bore 28 which accommodates a push pin 30 abutting the end of the valve spool 14. A centering spring 32 and a stop washer 34 are mounted within the enlarged and shouldered end of the bore 28. A pole shading ring 36 is provided in the left end of the pull piece 26. As seen in FIG. 3, a radial slot 38 serves to minimize the formation of eddy currents. Slidable within the left hand end of the core tube 10 is a cylindrical armature 40 which abuts the push pin 30. The armature may be provided with slots 42 permitting easy passage of fluid between the open spaces in the tube at the ends of the armature.

Figure 4:
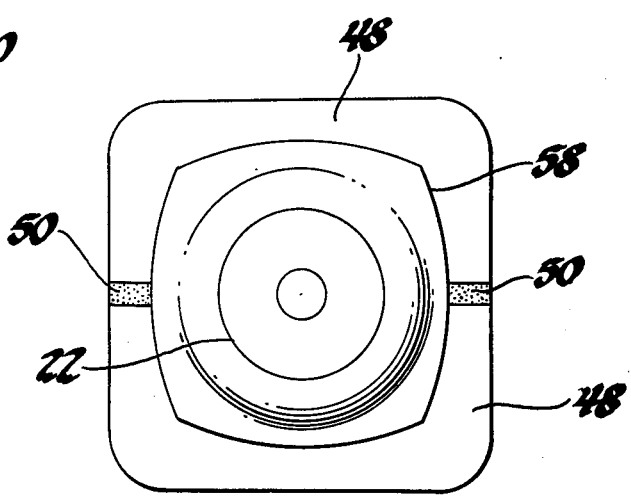
FIG. 4 is an end view of the solenoid as viewed from the left in FIG. 1.

Mounted on the outside of the core tube 10 is a bobbin 44 on which is wound an energizing coil 46. The coil is enclosed by a pair of cover halves 48 which together have a sort of barrel-shaped configuration and are sealed together and at the same time electrically separated by a pair of non-metalic compressible gaskets 50, as shown in FIG. 4. The walls of the cover halves 48 are much thicker than would be necessary for only mechanical enclosure and protection and are formed of high permeability material. Preferably, they are formed of a sintered powdered metal and are so dimensioned as to provide a flux path of comparable magnetic reluctance to that of pole piece 26 and the armature 40.

The cover halves 48 are provided with conical surfaces 52 and 54 at their opposite ends which cooperate with mating surfaces on a flange 56 and on an end cap 58 which serve to clamp the two cover halves 48 against the gaskets 50 when the end cap 58 is pressed to the right in FIG. 1 and secured to the end plug 22 by the set screw 60. One or both of the cover halves 48 may be provided with suitable apertures for carrying the terminal conductors (not shown) of the coil 46 to the outside.

When the coil 46 is energized with suitable current, the resulting flux flowing through the pole piece, the armature and the cover halves will have to traverse the air gap between the armature and pole piece and thus produce a strong force pulling the armature to the right in the well-known manner and acting through the push pin 30 to shift the valve spool 14 against a centering spring corresponding to the spring 32 but on the opposite end of the valve. When the coil current is shut off, that spring returns the parts to the position illustrated in FIG. 1. A similar solenoid at the opposite end of the valve can push the spool 14 push rod 30 and armature 40 to the left against the centering spring 32.

By the use of the thick-walled cover halves which are electrically insulated from one another, not only is this total flux path one of low reluctance, but also the path for concentric eddy currents is interrupted at the gaskets 50, when the solenoid is used in alternating current service. When in direct current service, the gaskets 50 serve to reduce hysteresis. These factors result in a high efficiency in the transfer of coil energizing current to mechanical pull at the armature and produces a lower rate of heat loss.

This construction also eliminates the need for encapsulation since the coil is fully mechanically and hermeticly enclosed against contaminating substances. Also, by providing more space within the cover halves than the coil actually occupies there is room to accommodate any gases produced by the overheating of the insulating material in the event of a coil burn out. Thus, OSHA safety requirements may be met.

Becasue the enclosure for the coil is entirely a mechanical assembly, it is a simple matter to remove and replace any coil since it is not permanently attached to any of the other parts as is the case with other constructions where the coil is incapsulated along with the exterior core frame. Thus, manufacturers and others who need to maintain an inventory of a wide variety of coils in a range of electrical specifications need only stock the coils themselves instead of the more costly and bulky encapsulated coil and frame assemblies heretofore necessitated.

I claim:

1. A solenoid construction comprising a tube with an open and a closed end, a pole piece with a central passage fixed in the open end, a push rod in the central passage, an armature slidable in the tube toward and away from the pole piece, an energizing coil surrounding the tube, and a mechanically massive cover surrounding the coil and the tube, the cover comprising a plurality of monolithic sections of magnetically permeable material spaced only slightly from each other circumferentially around the tube and coil and together having a total magnetic reluctance substantially the same as the reluctance of the pole piece, and means securing the sections in position around the tube and the coil.

2. A solenoid construction as defined in claim 1, wherein the tube is formed of a central portion of nonmagnetic material and end portions of magnetic material, the portions being fused together into an intregal member.

3. A solenoid construction as defined in claim 2, wherein the three portions are of stainless steel.

4. A solenoid construction as defined in claim 1, wherein the cover sections are formed of sintered powdered magnetic material.

5. A solenoid construction as defined in claim 1, wherein the cover sections include conical surfaces at their ends and the securing means includes axially shiftable members having mating conical surfaces for clamping the cover sections together.

6. In a wet armature type solenoid comprising a closed-ended tube having a fixed pole piece in its open end, and an armature slidable between the pole piece and the closed end, the tube carrying an energizing coil surrounding its mid portion, that improvement comprising a combined mechanical enclosure and external magnetic circuit comprising a plurality of massive monolithic cover sections separated by non-metallic gaskets and clamped together to form a barrel-shaped enclosure carrying substantially the entire flux generated by the coil externally of the tube.

7. A solenoid as defined in claim 6 wherein the cover sections are formed of sintered powdered magnetic material.

* * * * *